United States Patent
Peterreins

(10) Patent No.: US 10,871,010 B2
(45) Date of Patent: Dec. 22, 2020

(54) SWING TYPE SMA ACTUATOR

(71) Applicant: ACTUATOR SOLUTIONS GMBH, Gunzenhausen (DE)

(72) Inventor: Matthias Peterreins, Gunzenhausen (DE)

(73) Assignee: ACTUATOR SOLUTIONS GMBH, Gunzenhausen (DE)

( * ) Notice: Subject to any disclaimer, the term of this patent is extended or adjusted under 35 U.S.C. 154(b) by 0 days.

(21) Appl. No.: 16/753,132

(22) PCT Filed: Jun. 19, 2019

(86) PCT No.: PCT/IB2019/055148
§ 371 (c)(1),
(2) Date: Apr. 2, 2020

(87) PCT Pub. No.: WO2019/244062
PCT Pub. Date: Dec. 26, 2019

(65) Prior Publication Data
US 2020/0256090 A1    Aug. 13, 2020

(30) Foreign Application Priority Data

Jun. 22, 2018  (IT) .................. 102018000006584

(51) Int. Cl.
*E05B 51/00* (2006.01)
*E05B 17/18* (2006.01)
(Continued)

(52) U.S. Cl.
CPC .......... *E05B 51/005* (2013.01); *E05B 17/186* (2013.01); *F03G 7/065* (2013.01); *B60R 25/023* (2013.01); *E05B 2045/0665* (2013.01)

(58) Field of Classification Search
CPC ...... E05B 17/14; E05B 17/142; E05B 17/147; E05B 17/18; E05B 17/186; E05B 51/00;
(Continued)

(56) References Cited

U.S. PATENT DOCUMENTS 5,868,013 A * 2/1999 Julien ................. E05B 47/0009
70/38 A
7,380,843 B2 * 6/2008 Alacqua .............. E05B 47/0009
292/137
(Continued)

OTHER PUBLICATIONS

International Search Report, issued in PCT/IB2019/055148, PCT/ISA/210, dated Feb. 12, 2020.
(Continued)

*Primary Examiner* — Christopher J Boswell
(74) *Attorney, Agent, or Firm* — Birch, Stewart, Kolasch & Birch LLP

(57) ABSTRACT

The present invention is inherent to a swing-type Shape Memory Alloy (SMA) actuator (10) comprising a stationary frame (11) and a swingable part (12) that are coupled by means of a pivot (13) allowing the swing of the swingable part (12), two SMA wires (14, 14') being engaged to two connecting elements (15, 15') present respectively on a left and right portion of the swingable part (12) and vertically separated from the pivot (13), such that the activation of one of the SMA wires (14, 14') causes the swing of the swingable part (12) in either the clockwise or counter-clockwise direction.

21 Claims, 4 Drawing Sheets

Figure 1A:
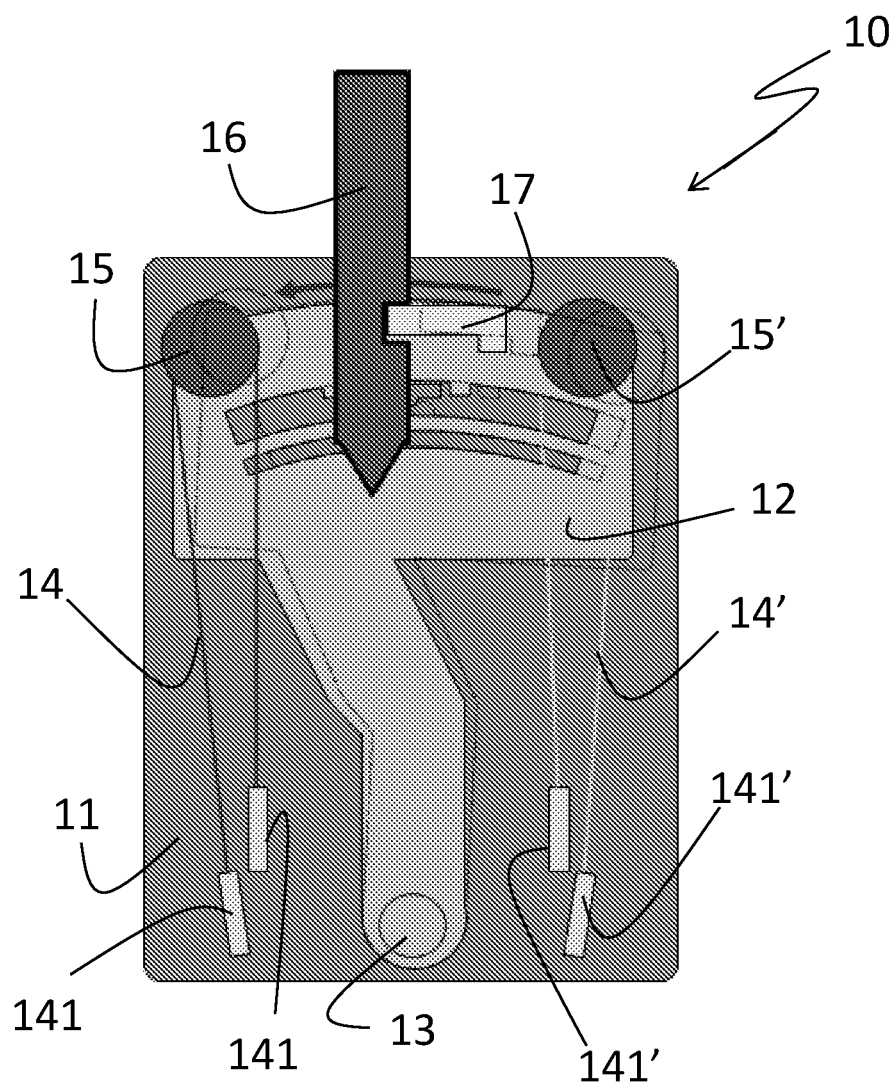

(51) Int. Cl.
*F03G 7/06* (2006.01)
*E05B 45/06* (2006.01)
*B60R 25/023* (2013.01)

(58) Field of Classification Search
CPC .......... E05B 51/005; E05B 2045/0665; B60R 25/023
See application file for complete search history.

(56) References Cited

U.S. PATENT DOCUMENTS

| | | | |
|---|---|---|---|
| 7,690,231 B1* | 4/2010 | Field | E05B 51/005 |
| | | | 70/283 |
| 9,101,984 B2* | 8/2015 | Bono | B22F 3/15 |
| 9,646,179 B1* | 5/2017 | Munns | E05B 47/0009 |
| 9,938,751 B2* | 4/2018 | Chow | E05B 17/0062 |
| 10,577,834 B1* | 3/2020 | Luedtke | E05B 47/0038 |
| 10,641,007 B2* | 5/2020 | Li | E05B 47/0012 |
| 2005/0252260 A1 | 11/2005 | Chu | |
| 2006/0172557 A1 | 8/2006 | He | |
| 2007/0132551 A1 | 6/2007 | Mozer et al. | |
| 2009/0322531 A1* | 12/2009 | Estevez | E05B 47/0009 |
| | | | 340/572.1 |
| 2010/0097223 A1* | 4/2010 | Kruest | E05B 47/0011 |
| | | | 340/572.1 |

OTHER PUBLICATIONS

Written Opinion of the International Searching Authority, issued in PCT/IB2019/055148, PCT/ISA/237, dated Feb. 12, 2020.

* cited by examiner

SWING TYPE SMA ACTUATOR

The present invention relates to a swing type Shape Memory Alloy (SMA) actuator and to devices using such an actuator with particular but not exclusive reference to car lids.

The use of SMA wires as actuators is increasingly appreciated due to the high degree of automation and control associated with their use, allowing them to be successfully employed in a wide field of applications, such as in camera modules, as for example described in the international patent application WO 2016/075606 in the applicant's name.

A field of particular interest is the use of SMA-based solutions to control locks or as additional lock control, such as described in the international patent application WO 2016/156283, and specifically solutions to control car fuel lids or charging lids (in case of electric cars), such as described for example in the international patent application WO 2013/130691 disclosing car lids automatic unlocking by means of an electric motor, and international patent application WO 2013/130495 disclosing the use of a sensor associated with the automatic actuation of a flap mounted moveably on a housing of an automobile.

Generally speaking, in any application in which the SMA actuator can replace a micromotor, there are advantages in terms of encumbrances, control and reliability, such as for example described in the US patent application number 2007/0123158 with regards to a SMA-based system for controlling louvers that are swingably supported at a duct outlet of a vehicle air conditioner. Differently from the present invention, the solution described in US 2007/0123158 does not address the problem of blocking/unblocking a movable element, as instead required in SMA-controlled solutions for locks.

The same applies to US patent application 2007/0132551 that discloses a SMA-based swing type actuator with the SMA wires acting on two pivoted arms that push on a swingable pie-shaped piece from opposite sides so as to move a horizontal rod, while a vertical rod is constantly pushed by a biasing spring into engagement with multiple recesses formed in the swingable part so as to provide a stable equilibrium position without applying power to the SMA wires.

Purpose of the present invention is to provide an automatic SMA-based actuator that is capable to replace motors or micromotors in applications such as car fuel lid automatic control, and in a first aspect thereof consists in an actuator comprising a stationary frame and a swingable part wherein the swingable part and the stationary frame are coupled by means of:
  a pivoting element allowing the swing of a swingable part,
  two shape memory alloy wires engaged to two connecting elements present on the swingable part and vertically separated from the pivoting element, said connecting elements being respectively on a left and right portion of the swingable part,
  wherein a movable element is coupled to the swingable part by means of a locking element present on the swingable part.

Figure 1B:
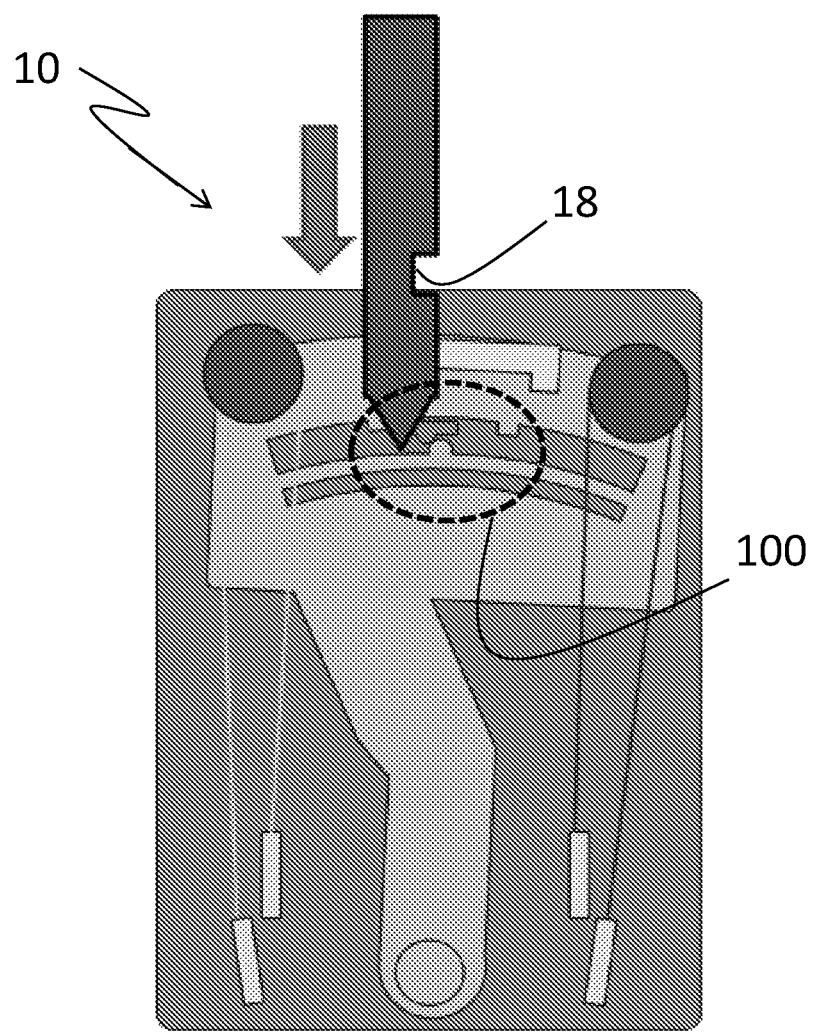
Figure 2A:
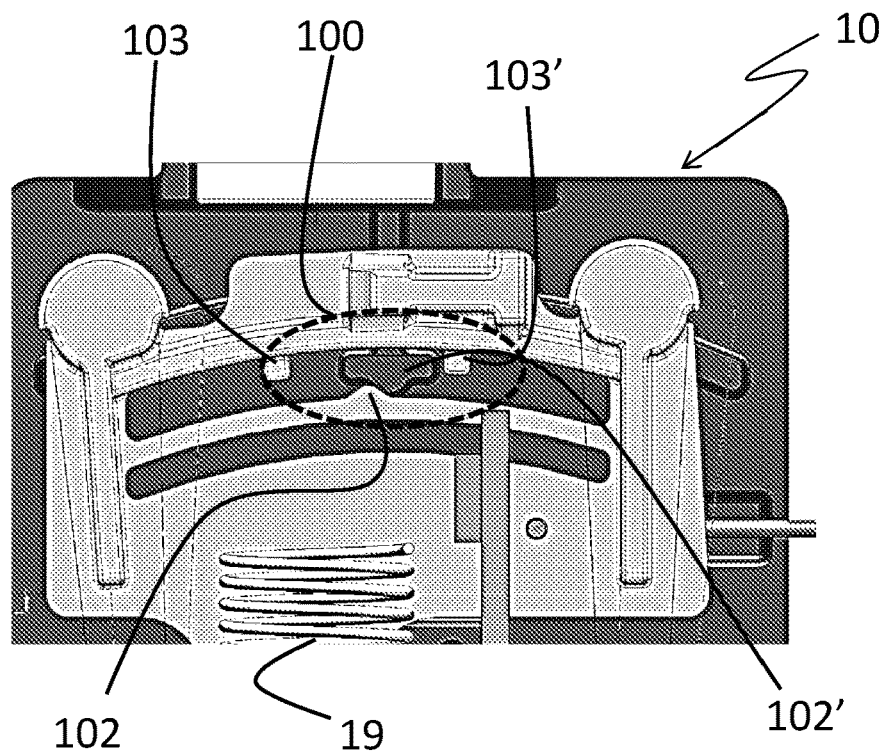
Figure 2B:
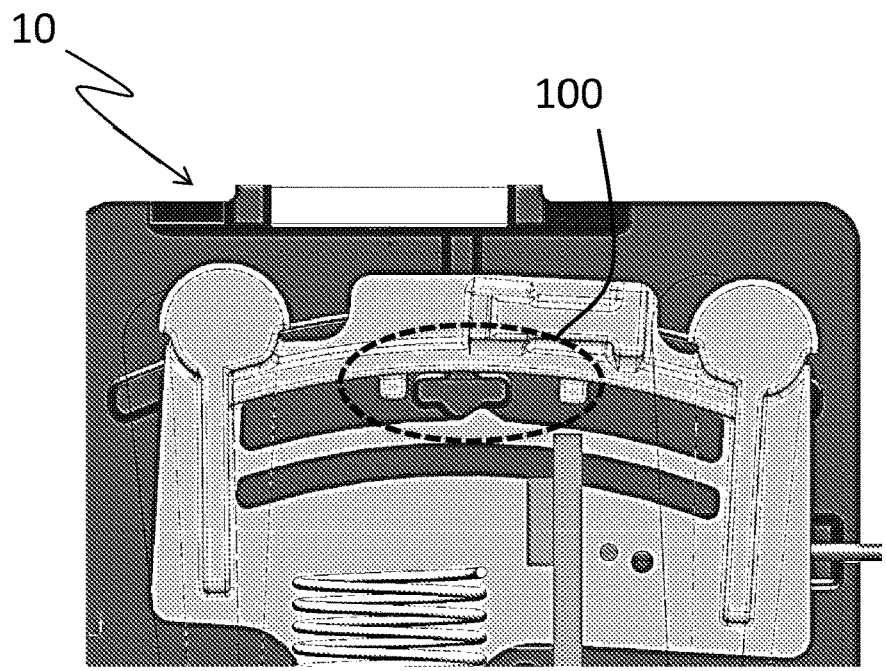
Figure 3:
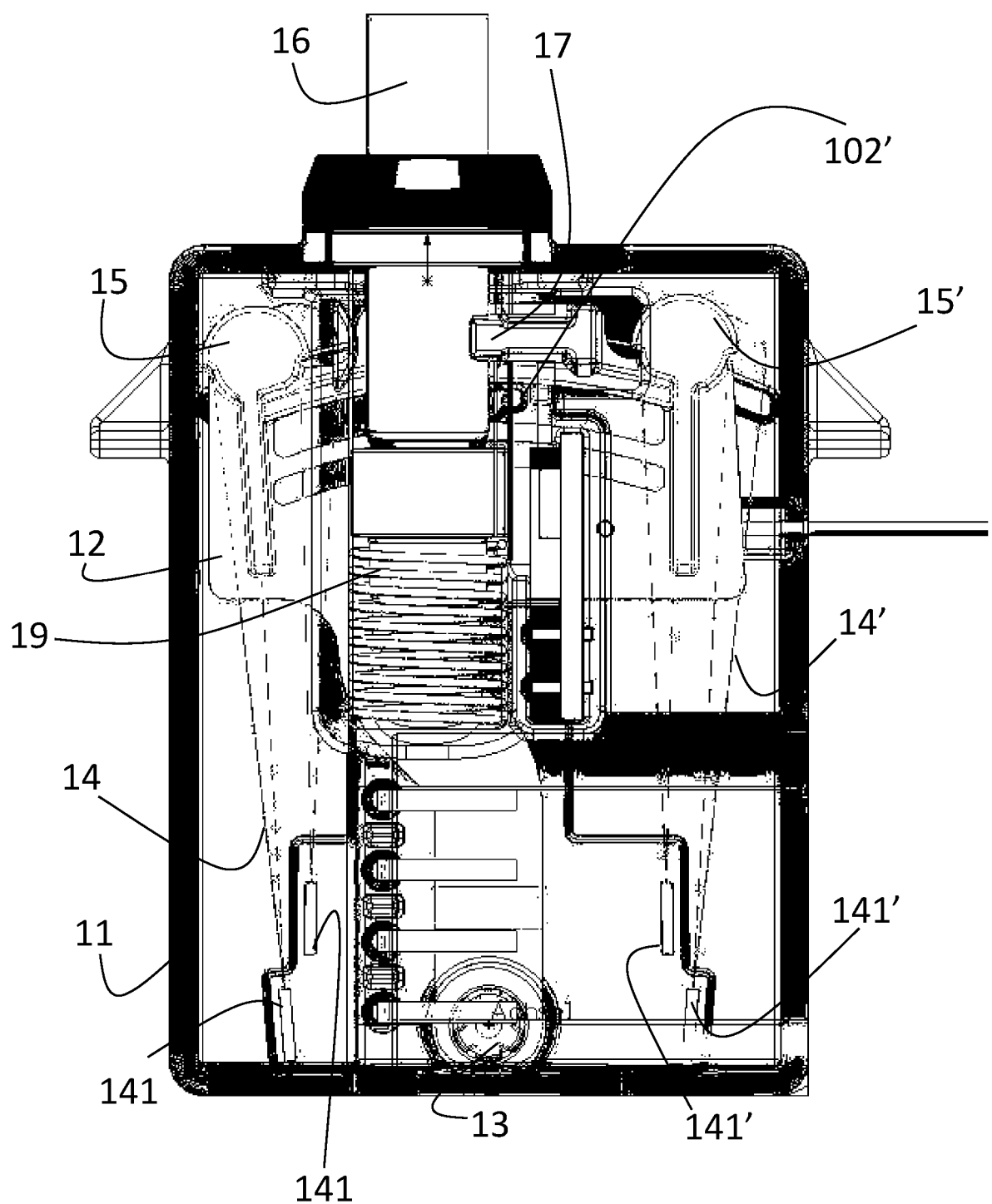

The invention will be further illustrated with the help of the following figures where:
FIGS. 1A and 1B are schematic views from above of a swing type actuator according to the present invention,
FIGS. 2A and 2B are schematic views from above of a detail of a swing type actuator according to the present invention with a bistable position control, and
FIG. 3 is a see-through view from above of an actuator according to the present invention.

In the figures the size and the dimensional ratios of the various elements shown in some cases have been altered in order to help understanding the drawings, with particular but not exclusive reference to the SMA wire diameter with respect to other elements of the swing actuator. Also, some ancillary elements not necessary for the invention understanding, such as a current supply source, have not been shown since they are ordinary means known in the technical field.

In FIG. 1 there is shown a swing type SMA actuator 10, comprising a stationary frame 11, over which there is pivoted a swingable part 12 via a pivot 13 allowing for the arc-type movement (swing) of the swingable part 12. Preferably, the swingable part 12 has a narrower section in correspondence of pivot 13 and a larger section in the upper portion of actuator 10, resembling a T-shaped structure.

The movement of the swingable part 12 is achieved by means of two antagonistic shape memory alloy wires 14, 14' that are alternately actuated via Joule heating. The shape memory alloy wires are bent and used in a U-shape configuration to allow for a higher length of wire, and therefore for a higher force applied. The extremities of wires 14, 14' are respectively fixed onto the stationary frame 11 at anchoring points 141, 141', on either side of pivot 13, and a central portion of wires 14, 14' is wound on connecting elements 15, 15', positioned over the swingable element 12.

As shown in FIGS. 1A and 1B, the connecting elements 15, 15' are preferably symmetrically disposed on the swingable element 12 in the upper portion of the actuator 10 (horizontal arms of the T).

On the swingable element 12 there is a locking element 17 that blocks a movable element 16 by entering into a suitable recess 18 formed into it.

The controlled movement of element 16 is the purpose of the actuation, in this case achieved by heating shape memory alloy wire 14', whose shortening causes the clockwise rotation of the swingable part 12, thus disengaging the locking element 17 from the recess 18 in the movable element 16. This results in a movement of element 16 that is driven by a preloaded spring 19, not shown in FIGS. 1A-1B to allow for better appreciation of other elements, such as pivot 13, but instead indicated in FIGS. 2A-2B.

FIGS. 2A and 2B show schematic views from above of a detail of the swing type actuator 10 as indicated by the dotted oval 100 in FIG.1B, with the purpose of illustrating a bistable locking mechanism 100 usefully employed in a bistable swinging actuator according to the present invention. Bistable mechanism 100 comprises an embossed portion 102' on fixed frame 11, rising from the plane of frame 11 to match an engaging feature 102 and two movement end-stoppers 103, 103' formed on the swingable part 12. As already mentioned the use of shape memory alloy wires 14, 14' in a bent configuration allows to exert a higher force, therefore allowing to use a bistable mechanism with an increased stability, i.e. requiring a higher force to be moved between the two stable positions.

In FIGS. 2A and 2B there is also shown the terminal part of spring 19 that acts on element 16, spring 19 being compressed when the locking element 17 is engaged so as to push element 16 toward the outside of actuator 10 upon disengagement, i.e. when the swingable part 12 is pulled/swung clockwise by the action of the shape memory alloy wire 14'.

During this rotation, the bistable mechanism 100 moves from the first stable position of FIG. 2A to the second stable position of FIG. 2B by elastically deforming the arc on which the engaging feature 102 is formed, i.e. by pushing down the latter so that it passes under the fixed embossed portion 102'. Obviously, the reverse movement occurs when the SMA wire 14 is activated and the swingable part 12 rotates counter-clockwise, the end of the travel in each direction being defined by the respective stopper 103, 103'.

Control of the correct position and movement of the swingable part (12) can be achieved by providing a displacement position sensor located between the stationary frame (11) and the swingable part (12), such as a Hall effect sensor, a potentiometer or the like.

FIG. 3 is a see-through view from above of an actuator according to the present invention in a more complete representation. The main and fundamental elements that have already been described with reference to FIGS. 1A, 1B, 2A, 2B are indicated herein with the same numerals.

It is to be understood that the present invention is not limited to the specific embodiment shown in the above figures, but other variants are encompassed. For example, the shape memory alloy wires 14, 14' can be simple straight wires extending between anchoring points located respectively on the fixed frame 11 and on the swingable part 12.

The present invention is not limited to a specific type of shape memory alloy wire, even though from a geometrical point of view are usefully used SMA wires with a diameter comprised between 0.010 mm and 5 mm. In this regards it is important to underline that as the shape memory alloy wires are real objects, depart from a circular section is possible, therefore the term diameter is to be intended as the diameter of the smallest enclosing circle.

The invention is not limited to any specific shape memory alloy material, even though preferred are Ni—Ti based alloys such as Nitinol that may exhibit alternately a super-elastic wire behavior or shape memory alloy behavior according to its processing. The properties of Nitinol and methods allowing to achieve them are widely known to those skilled in the art, see e.g. the article "A Study of the Properties of a High Temperature Binary Nitinol Alloy Above and Below its Martensite to Austenite Transformation Temperature" by Dennis W. Norwich presented at the SMST 2010 conference.

Nitinol may be used as such or its characteristics in terms of transition temperature may be tailored by adding elements such as Hf, Nb, Pt, Cu. The proper choice of material alloy and its characteristics are commonly known by a person those skilled in the art, see for example:

http://memry.com/nitinol-iq/nitinol-fundamentals/transformation-temperatures

Also the shape memory alloy wires may be used "per se" or with a coating/sheath to improve their thermal management, i.e. their cooling after being actuated. The coating sheath may be uniform, such as described in the U.S. Pat. No. 9,068,561 that teaches how to manage residual heat by resorting to an electrically insulating coating which is a heat conductor, while U.S. Pat. No. 6,835,083 describes a shape memory alloy wire having an enclosing sheath capable to improve cooling after every actuation cycle. Also a coating made with or containing phase changing materials, as described in the U.S. Pat. No. 8,739,525, may be advantageously employed.

In a second aspect thereof the invention consist in a device, such as for example a fuel lid or a charge supply lid in case of electric/hybrid cars incorporating a swing type SMA actuator according to the present invention.

The invention claimed is:

1. An actuator (10) comprising a stationary frame (11) and a swingable part (12) that are coupled by means of:
   a pivot (13) allowing the swing of said swingable part (12),
   two shape memory alloy wires (14, 14') engaged to two connecting elements (15, 15') present on the swingable part (12) and vertically separated from the pivot (13), said connecting elements (15, 15') being respectively on a left and right portion of the swingable part (12), such that the activation of one of said shape memory alloy wires (14, 14') causes the swing of the swingable part (12) in either the clockwise or counter-clockwise direction,
   characterized in that the actuator further comprises a movable element (16) that is slidable towards the outside of the actuator under the action of a biasing spring (19) upon disengagement, caused by said swing of the swingable part (12), of a locking element (17) located on the swingable part (12) and engaged in a recess (18) of said movable element (16).

2. The actuator (10) according to claim 1, wherein the two connecting elements (15, 15') are attached to a top portion of the swingable part (12) and are symmetrically disposed on the swingable part (12) with respect to the pivoting element (13).

3. The actuator (10) according to claim 2, wherein the swingable part (12) has a substantially T-shaped structure, the T-shaped structure includes the top portion and a bottom portion opposite to the top portion,
   wherein the two connecting elements (15, 15') are attached to the top portion of the swingable part (12), and
   wherein the pivot (13) is located at the bottom portion of the swingable part (12).

4. The actuator (10) according to claim 2, wherein the shape memory alloy wires (14, 14') have a diameter comprised between 0.010 mm and 5 mm.

5. An actuator (10) according to claim 2, wherein an intermediate portion of each shape memory alloy wires (14, 14') is wound over the respective connecting element (15, 15').

6. An actuator (10) according to claim 2, comprising a swinging control bistable mechanism (100).

7. The actuator (10) according to claim 1, wherein the swingable part (12) has a substantially T-shaped structure, the T-shaped structure includes a top portion and a bottom portion opposite to the top portion,
   wherein the two connecting elements (15, 15') are attached to the top portion of the swingable part (12), and
   wherein the pivot (13) is located at the bottom portion of the swingable part (12).

8. The actuator (10) according to claim 7, wherein the shape memory alloy wires (14, 14') have a diameter comprised between 0.010 mm and 5 mm.

9. An actuator (10) according to claim 7, wherein an intermediate portion of each shape memory alloy wires (14, 14') is wound over the respective connecting element (15, 15').

10. An actuator (10) according to claim 7, comprising a swinging control bistable mechanism (100).

11. The actuator (10) according to claim 1, wherein the shape memory alloy wires (14, 14') have a diameter between 0.010 mm and 5 mm.

12. An actuator (10) according to claim 11, wherein an intermediate portion of each shape memory alloy wires (14, 14') is wound over the respective connecting element (15, 15').

13. An actuator (10) according to claim 11, comprising a swinging control bistable mechanism (100).

14. The actuator (10) according to claim 1, wherein an intermediate portion of each shape memory alloy wires (14, 14') is wound over the respective connecting element (15, 15').

15. The actuator (10) according to claim 1, comprising a swinging control bistable mechanism (100).

16. The actuator (10) according to claim 15, wherein said bistable mechanism (100) comprises an embossed element (102') on the stationary frame (11), and a matching protrusion (102) and two movement end-stoppers (103, 103') on the swingable part (12).

17. The actuator (10) according to claim 1, wherein a displacement position sensor is present between the stationary frame (11) and the swingable part (12).

18. The actuator according to claim 17, wherein said sensor is a Hall sensor.

19. The actuator (10) according to claim 1, wherein the movable element (16) includes a notch for engaging a locking element (17) of the actuator (10) upon being engaged with the actuator (10), and wherein the movable element (16) acts as a device locking/unlocking element.

20. The actuator according to claim 19, wherein said device is a car lid, preferably a fuel lid or a charge supply lid.

21. An actuator (10) comprising a stationary frame (11) and a swingable part (12) that are coupled by means of:
- a pivot (13) allowing the swing of said swingable part (12),
- two shape memory alloy wires (14, 14'), each shape memory alloy wire (14, 14') being wound around a respective one of two connecting elements (15, 15') attached to the swingable part (12) and vertically separated from the pivot (13), said connecting elements (15, 15') being respectively attached to a left portion and a right portion of the swingable part (12), such that the activation of one of said shape memory alloy wires (14, 14') causes the swing of the swingable part (12) in either the clockwise or counter-clockwise direction,
- characterized in that the actuator further comprises a movable element (16) that is slidable towards the outside of the actuator under the action of a biasing spring (19) upon disengagement, caused by said swing of the swingable part (12), of a locking element (17) located on the swingable part (12) and engaged in a recess (18) of said movable element (16).

* * * * *